US011346955B2

(12) United States Patent
Günther et al.

(10) Patent No.: US 11,346,955 B2
(45) Date of Patent: May 31, 2022

(54) SATELLITE SYSTEM FOR NAVIGATION AND/OR GEODESY

(71) Applicant: Deutsches Zentrum Für Luft—Und Raumfahrt E.V., Cologne (DE)

(72) Inventors: Christoph Günther, Weßling (DE); Johann Furthner, Deggendorf (DE)

(73) Assignee: Deutsches Zentrum Für Luft—Und Raumfahrt E.V., Cologne (DE)

( * ) Notice: Subject to any disclaimer, the term of this patent is extended or adjusted under 35 U.S.C. 154(b) by 4 days.

(21) Appl. No.: 16/614,860

(22) PCT Filed: May 22, 2018

(86) PCT No.: PCT/EP2018/063347
§ 371 (c)(1),
(2) Date: Nov. 19, 2019

(87) PCT Pub. No.: WO2018/215440
PCT Pub. Date: Nov. 29, 2018

(65) Prior Publication Data
US 2020/0209404 A1    Jul. 2, 2020

(30) Foreign Application Priority Data
May 22, 2017 (DE) .................. 10-2017-111091.7

(51) Int. Cl.
*G01S 19/02* (2010.01)
*H04B 7/195* (2006.01)
*H04L 7/00* (2006.01)

(52) U.S. Cl.
CPC .............. *G01S 19/02* (2013.01); *H04B 7/195* (2013.01); *H04L 7/0075* (2013.01)

(58) Field of Classification Search
CPC ........... G01S 19/02; G01S 11/08; G01S 19/32
See application file for complete search history.

(56) References Cited

U.S. PATENT DOCUMENTS 5,722,042 A * 2/1998 Kimura .................. H04B 7/195
342/352
5,982,323 A  11/1999 Czichy
(Continued)

FOREIGN PATENT DOCUMENTS

CN  101793526 B   8/2010
EP  0880031 A1   11/1998
(Continued)

OTHER PUBLICATIONS

Tishchenko et al. Method of identifying parameters of navigation satellites and improve accuracy of determining coordinates of a navigation receiver, see abstract (Year: 2016).*
(Continued)

*Primary Examiner* — Keith Ferguson
(74) *Attorney, Agent, or Firm* — Christensen, Fonder, Dardi & Herbert PLLC; Peter S. Dardi; Peder Jacobson

(57) ABSTRACT

The satellite system for navigation and/or geodesy according to the invention is provided with a plurality of MEO satellites, each comprising a dedicated clock, which are arranged in a distributed manner on orbital planes and orbit the Earth, wherein a plurality of MEO satellites, particularly eight, are located in each orbital plane. The satellite system according to the invention is further provided with a plurality of LEO satellites and/or a plurality of ground stations. Each MEO satellite comprises two optical terminals for bidirectional transmission of optical free-beam signals by use of lasers with the respectively first and/or second MEO satellite orbiting ahead in the same orbital plane and with the first and/or second MEO satellite orbiting behind. By use of the optical free-beam signals, the clocks of the MEO satellites are synchronized with each other for each orbital plane at an orbital plane time applicable to this orbital plane.

19 Claims, 1 Drawing Sheet

(56) References Cited

U.S. PATENT DOCUMENTS

| | | | | |
|---|---|---|---|---|
| 6,373,432 | B1* | 4/2002 | Rabinowitz | G01S 19/11 |
| | | | | 342/357.29 |
| 2003/0067409 | A1* | 4/2003 | Murphy | G01S 19/07 |
| | | | | 342/357.21 |
| 2010/0265132 | A1* | 10/2010 | Oehler | G01S 19/20 |
| | | | | 342/357.58 |
| 2012/0154062 | A1* | 6/2012 | Wilkinson | H03L 7/26 |
| | | | | 331/94.1 |
| 2013/0009812 | A1* | 1/2013 | Sato | B64G 1/36 |
| | | | | 342/357.26 |
| 2016/0065308 | A1 | 3/2016 | Coleman et al. | |
| 2017/0366251 | A1* | 12/2017 | Ravishankar | H04B 7/18584 |

FOREIGN PATENT DOCUMENTS

| WO | WO-9607113 A1 * | 3/1996 | G01V 7/16 |
|---|---|---|---|
| WO | 00-63646 A1 | 10/2000 | |

OTHER PUBLICATIONS

Exertier et al., "Time Biases in Laser Ranging Observations: A Concerning Issue og Space Geodesy", Advances in Space Research 60 (May 2017) pp. 948-968.

Gill et al., "Optical Atomic Clocks for Space", National Physical Laboratory, Version 1.7, Nov. 2008.

Hodge et al., "Untra-Stable Optical Frequencies for Space", Joint Meeting EFTF—IEEE IFCS, p. 663-666, (1999).

Meng et al., "Design and Experiment of Onboard Laser Time Transfer in Chinese Beidou Navigation Satellites", Advances in Space Research 51 (2013), pp. 951-958.

Plag et al., "Meeting the Requirements of a Global Society on a Changing Planet in 2020", The Global Geodetic Observing System, (Mar. 2008).

International Search Report for Application No. PCTEP2018/063347 dated Aug. 23, 2018.

* cited by examiner

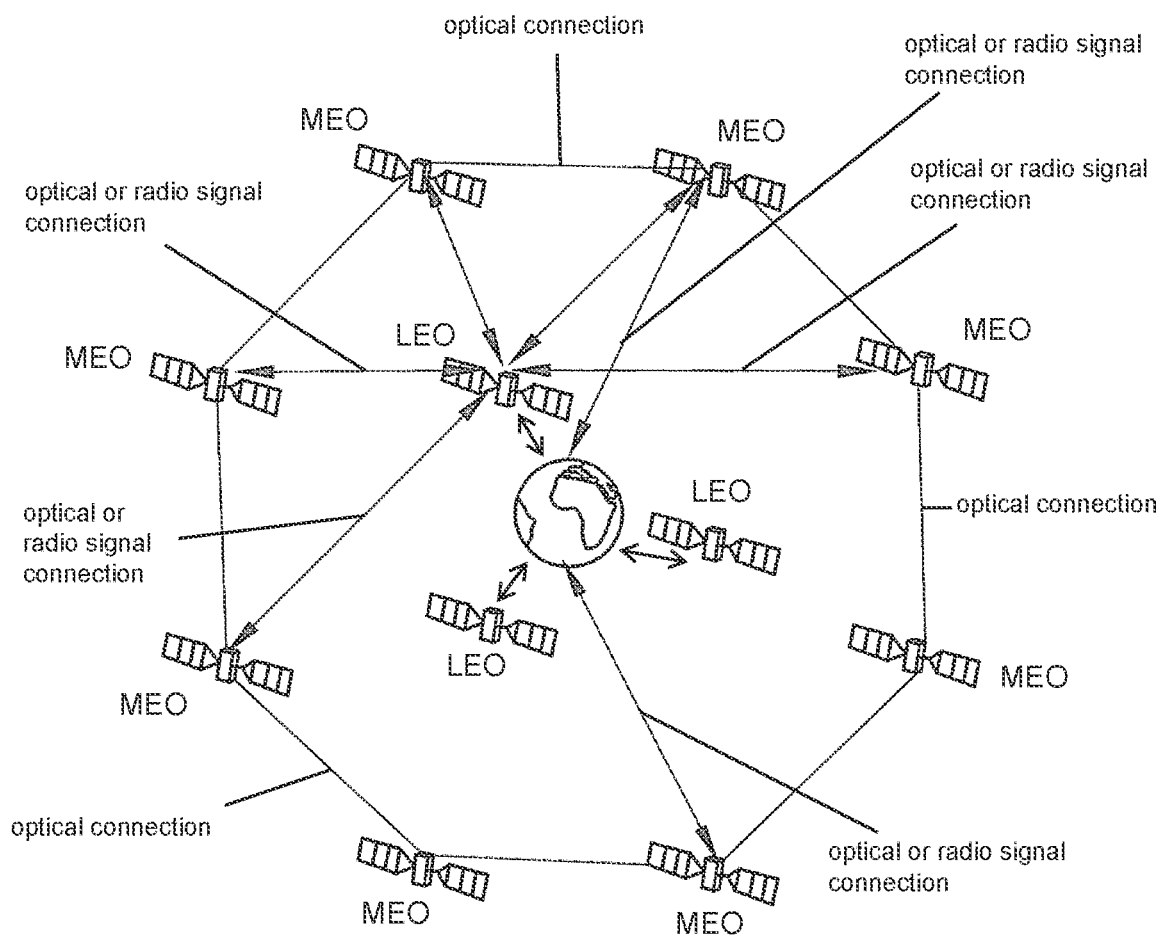

SATELLITE SYSTEM FOR NAVIGATION AND/OR GEODESY

This application is a national stage application of PCT application PCT/EP2018/063347 to Gunther et al., filed May 22, 2018, which claims priority to DE application 10-2017-111091.7 filed on May 22, 2017, both of which are incorporated herein by reference.

BACKGROUND

The present patent application claims priority to the German patent application 10 2017 111 091.7 of 22 May 2017, the content of which is hereby incorporated by reference into the present patent application.

The invention relates to a satellite system for navigation and/or geodesy.

Current satellite navigation systems transmit signals in the radio frequency range (L band). The frequency of the signals is derived from an atomic clock. The orbit of the satellites and the deposition of the clocks are determined by ground measurements. These systems are also used for geodesy. In addition, some specific mission have been launched for geodesy, such as GRACE, GOCE and LAGEOS.

The current satellite navigation systems have some disadvantages. For example, the current navigation systems are quite strongly depending on a complex ground infrastructure. Due to the one-way-measurement in current satellite navigation systems, it is quite hard to separate time, height and troposphere delay. It is particularly difficult to determine the orbital component in flight direction. Even though the known systems are also used for geodesy, they were not configured for this purpose.

Plag, H P., Pearlman, M: The Global Geodetic Observing System: Meeting the Requirements of a Global Society on a Changing Planet in 2020, The Reference Document (V0.18), The Global Geodetic Observing System of the International Association of Geodesy IAG/GGOS, GGOS 2020 Web Page, 20 Mar. 2008, http://www.iag-ggos.org/sci/ggos2020/versions/GGOS2020_REF_DOC_V0.18.pdf describes the concept for a Global Geodetic Observing System (GGOS) of the International Association of Geodesy (IAG) (see page 8, left column, paragraph 2). It consists of five observation planes (see page 144, FIG. 70), with plane 1 of the ground station, plane 2 of the LEO satellite, plane 3 of the MEO/GEO satellite, plane 4 of the planets and plane 5 of the quasars. The planes 1 to 3 correspond to the claimed system in claim 1 of the application. For the GGOS concept, it is proposed to use the latest technology, e.g. optical transmission between the satellites and high-precision optical clocks in the satellites (see page 151, left column, paragraph 1).

Gill, P., Margolis H. S., et al.: Optical Atomic Clocks for Space. Technical Supporting Document, National Physical Laboratory, UK, November 2008, http://www.npl.co.uk/upload/pdf/atomic_clocks_space.pdf describes technical possibilities for optical clocks for space applications. Here, the usage of optical clocks and the communication between the satellites by means of optical transmission is also proposed (see page 25, page 73, chapter 3.5.1.3, page 74, chapter 3.5.1.4).

US-A-2016/0065308 discloses a satellite communication system for optical broadband free-space communication. The system includes an exemplary MEO satellite constellation with eight satellites (see FIG. 1) forming a coherent coverage of a band of the Earth (i.e. common orbit). Each satellite of the MEO satellite constellation is optically connected to the nearest neighbors, both orbiting ahead and behind (see FIG. 1, paragraph 20). The satellites of this MEO constellation are connected to ground stations (see FIG. 1, paragraph 23). Combinations of LEO satellites and MEO satellites are also proposed for this satellite communication system (see paragraph 27).

SUMMARY

The object of the invention is to provide a satellite navigation system that is improved with regard to various aspects and that is also adapted to be used in geodesy.

According to the invention, this object is achieved by a satellite system for navigation and geodesy, wherein the satellite system is provided with
- a plurality of MEO satellites (in a height of 10,000 km to 30,000 km), each comprising a dedicated clock, which are arranged in a distributed manner on orbital planes and orbit the Earth, wherein a plurality of MEO satellites, particularly eight, are located in each orbital plane, and
- a plurality of LEO satellites and/or a plurality of ground stations,
- wherein each MEO satellite comprises two optical terminals for bidirectional transmission of optical free-beam signals by means of lasers with the respectively first and/or second MEO satellite orbiting ahead in the same orbital plane and with the first and/or second MEO satellite orbiting behind, and
- wherein, by means of the optical free-beam signals, the clocks of the MEO satellites are synchronized with each other for each orbital plane at an orbital plane time applicable to this orbital plane.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure.

FIG. 1 depicts an exemplary embodiment of a structure of the satellite system according to the invention.

DETAILED DESCRIPTION

The invention proposes a satellite system for navigation and geodesy in which a plurality of Medium Earth Orbit (MEO) satellites are used which orbit the Earth while being arranged in a distributed manner on at least two, preferably three, orbital planes. In each orbital plane a plurality of MEO satellites, particularly eight, are located. Between the MEO satellites of each orbital plane there is a single or multiple optical connection of adjacent satellites with optical frequency normals, i.e. a time base with laser assistance. Thus, a highly stable system time scale with extremely high short-term stability can be set up, if, which is advantageous, each MEO satellite has a cavity-stabilized or resonator-stabilized laser with an optical resonator forming the time base of the MEO satellite. In the Medium Earth Orbit, the optical free-beam communication is not subject to any influences by the Earth's atmosphere, so that this does not affect the accuracy of the orbital plane system time. In addition to the high-precision reference system in time, according to the invention, a high-precision reference system for space can also be set up with the proposal according to the invention, since the orbits are stable and measured with high precision. Dedicated optical individual communication links from MEO satellites to LEO satellites and from these to ground stations or directly from MEO satellites to ground stations can then be used to establish synchronization with reference systems on the ground (for both time and space). The accuracy of frequency and time synchronization as well as of distance measurements to various objects in space and/or on Earth can be determined, compared to the state of the art, with much higher precision by means of the satellite system according to the invention.

In an advantageous embodiment of the invention it is provided that the clock of each MEO satellite comprises a laser stabilized by an optical cavity.

In a further expedient embodiment of the invention it can be provided that the MEO satellites transmit radio signals for navigation (e.g. in the L or S band) and synchronize these with the highly stable optical clock signals by means of a frequency comb.

According to an advantageous embodiment of the invention it can be provided that LEO satellites (in a height of 400 to 1,500 km) and/or ground stations are equipped with navigation receivers to receive radio signals of the MEO satellites.

It can further be provided according to an advantageous embodiment of the invention that the LEO satellites are equipped with transmitters and the MEO satellites with receivers for radio signals to perform bidirectional pseudorange measurements of the MEO and/or LEO satellites.

According to a further advantageous embodiment of the invention it can be provided that the MEO satellites are equipped with a terminal that can be aligned with at least respectively one of the LEO satellites and/or respectively one of the ground stations.

In an advantageous embodiment of the invention it is provided that at least one LEO satellite carries at least one optical terminal.

According to an advantageous embodiment of the invention it can be provided that the orbital plane times in the individual orbital planes of the MEO satellites are synchronized via the LEO satellites and/or the ground stations by using optical signals and/or radio waves.

In a further expedient embodiment of the invention it can be provided that clocks with a very high long-term stability (in the sense of a low Allan standard deviation) are operated on LEO satellites and/or in ground stations and that the time-synchronized constellation of MEO satellites is used for time distribution.

It is further advantageous that the MEO satellites and/or the LEO satellites and/or the ground stations exchange measurements and/or other information on optical signals or radio waves.

In a further expedient embodiment of the invention it can be provided that, for example, the ground stations estimate the orbits, signal offsets and optionally atmospherical parameters on LEO satellites and/or control stations on the ground and distribute this information via optical signals and/or radio waves to the MEO satellites.

According to a further advantageous embodiment of the invention it can be provided that, for example, orbital variations of LEO satellites determinable by acceleration sensors can be used to measure the Earth's gravitational field.

It can further be provided according to an advantageous embodiment of the invention that, for example, orbital variations of MEO satellites determinable by distance measurements between the MEO satellites of each orbital plane can be used for measuring the radiation pressure of the Sun.

In an advantageous embodiment of the invention it is provided that, as already mentioned above, the clock of each MEO satellite comprises a cavity-stabilized or resonator-stabilized laser with an optical resonator.

It is further advantageous if the MEO satellites orbit the Earth at the same distance or substantially at the same distance, wherein the distance being between 20,000 km and 25,000 km, and particularly 23,000 km, while it may also be advantageous that the LEO satellites comprise a plurality of higher-orbiting first LEO satellites orbiting the Earth at a same first distance of or substantially of 1,000 km to 1,400 km, particularly 1,200 km, and a plurality of lower-orbiting second LEO satellites orbiting the Earth at a same second distance of 200 km to 600 km, particularly 300 km or 400 km to 600 km.

In a further expedient embodiment of the invention it can be provided that, in order to communicate with the MEO satellites and the ground stations, the LEO satellites comprise frequency converters, particularly frequency combs, for converting the optical signals of the MEO satellites into radio signals for the ground stations and vice versa.

The LEO satellites, and particularly, if existing, the lower-orbiting LEO satellites, are expediently suitable for measuring the Earth's gravitational field and comprise, for this purpose, cavity-stabilized or resonator-stabilized laser clocks and/or inertial sensors.

It is further advantageous that, due to the, at least for a short-term, extremely high time stability according to the invention, the MEO satellite orbits and speeds and/or the solar pressure can be measured with high precision between the MEO satellites of a common orbital plane. The effects of solar pressure indicate that a satellite that is orbiting the earth in its orbit towards the Sun is orbiting slower than if it was to move away from the Sun. Due to the highly stable signals of the resonator-stabilized lasers, the smallest speed variations can now be measured and used for the current determination of the location of the MEO satellites.

In a further expedient embodiment of the invention it can be provided that the ground stations can be used for leveling the orbital plane times, leveled by the LEO satellites, of the MEO satellites with a or with the terrestrial time reference system by taking into account a potential relative rotation of the Earth and the MEO satellite arrangement.

The satellite system for navigation and geodesy according to the invention makes advantageous use of the knowledge gained from the invention that resonator-stabilized lasers can generate a much more stable signal than quartz-stabilized oscillating circuits, much higher stability has been reached with optical clocks (at least in the laboratory) than with today's atomic clocks, optical signals enable a significantly better time and spatial resolution than radio signals, frequency combs used as frequency converters are able to convert optical signals into radio signals, and modern and compact inertial sensors enable the measurement of smallest accelerations so that they can be used for measuring the Earth's gravitational field, wherein it turned out that for this purpose, in addition to the clocks provided according to the invention, the high-precision inertial sensors can be used as have been proposed by Prof. Braxmaier in Bremen and Prof. Ertmer in Hannover.

The satellite system according to the invention can be applied to all areas of today's satellite navigation and geodesy but with significantly higher accuracy than is currently the case, particularly also as real time Precise Point Positioning (PPP).

FIG. 1 shows an exemplary embodiment of a structure of the satellite system according to the invention, wherein only one of a plurality of, preferably three, uniformly tilted orbital planes for the MEO satellites and the LEO satellites is illustrated. Furthermore, the ground stations are indicated. In FIG. 1, the architecture of the system is roughly illustrated. The outer MEO satellites comprise cavity-stabilized lasers. These are synchronized within an orbital plane via optical bidirectional links, namely by a known time leveling. The inner LEO satellites establish the optical connection between the MEO satellites of the individual orbital planes and measure the navigation signals.

Thus, the architecture consists of a Medium Earth Orbit (MEO) partial constellation and optionally of a Low Earth Orbit (LEO) partial constellation. The satellites are optically linked to one another. The connections are used for synchronization, distance measurement and data transmission. The key differences compared to the state of the art are:
- the use of optical resonators in satellite navigation
- the optical time transfer between these satellites (ranging has already been done), particularly by using coherent phase measurements
- the calculated extremely stable time in the short-term range in each orbital plane
- the linkage of the orbital planes via LEO satellites or the ground
- the synchronization with optical clocks in LEO orbits
- the measurement of the signals of the MEO satellites by receivers on the LEO satellites The system consist of MEO satellites in three orbital planes (similarly to Galileo or GLONASS) and a number of lower-orbiting satellites in Low Earth Orbit (LEO). The free-running time base of the MEO satellites is generated in the optical range by lasers and is stabilized by a cavity which results in a very high short-term stability. The free-running time bases of the satellites are synchronized within an orbital plane by bidirectional laser links. Due to the enormous time resolution of the laser links, this synchronization is extremely good (the absolute measurement resolution is in the range of $10^{-12}$ seconds); frequencies can be compared even more precisely. At most, vibrations of the satellite have a limiting effect. The three satellite planes synchronized with high-precision provide three times which are preferably leveled optically or bidirectionally via one or a plurality of LEO satellites. This creates an enormously rigidly synchronized time reference in the entire system. The optical bidirectional connections are further used to measure distances and estimate solar pressure and satellite orbits with high accuracy. Finally, these connections are also used for data transmission.

With a frequency comb, the stability of the optical time measurement system is transferred to radio waves. The frequencies of radio waves are today predominantly in the lower and middle L band. In such wave lengths, the signals easily penetrate clouds and can be processed in compact terrestrial receivers. However, the same signals are also received and processed by the LEO satellites to determine the satellite orbits and instrument offsets. This is particularly successful because the signals do not pass through the atmosphere and are therefore not falsified by it. The entire data exchange in this system can take place via the bidirectional optical connections and thus completely within the system. The previously described satellite system alone, i.e. without terrestrial infrastructure, provides the possibility of high-precision positioning relative to an abstract satellite-based reference system. With a ground infrastructure, this reference system is leveled with a terrestrial reference system. A rotation between these two systems is primarily critical. Moreover, a ground infrastructure can be used to measure atmospherical parameters and earth tides. Measurement data from the ground can be fed back to the satellite system via adequate radio connections (today in C band) so that the terrestrial infrastructure does not need to be linked separately. A single C band antenna on each location which is aligned to a satellite, i.e. a LEO or MEO satellite, is sufficient since the data can be forwarded optically within the system via the connections between the satellites at the target satellites (today a plurality of antennas are required at the uplink stations).

The satellites themselves carry at least three optical terminals. One terminal is oriented towards the satellite orbiting ahead in the same orbital plane. Another one is oriented towards the satellite orbiting behind. And another one is oriented downwards in the direction of the LEO satellites or the Earth. The third terminal creates a connection to LEO satellites. Alternatively, it can also be oriented towards the Earth. On the one hand it serves for synchronizing the orbits and on the other hand for determining the orbits (MEO and LEO). The time base of the abovedescribed system is extremely stable over short periods of time, which is absolutely sufficient for navigation. However, the system can also be used for comparing highly stable clocks on the ground or to provide the time of such highly stable clocks to the user. It is also particularly interesting to use highly stable clocks for the LEO satellites and to create a world time there. If these clocks have a stability of $10^{-18}$ seconds, they can be used for measuring the Earth's gravitational field.

The LEO satellites are orbiting so low that they can be used perfectly for measuring the Earth's gravitational field. Except clocks, high-precision inertial sensors, such as those built by Prof. Braxmaier in Bremen and Prof. Ertmer in Hannover, can additionally be used for this purpose.

Variants of the invention may also be described by the following features which can be described as grouped together in the following groups and/or individually as exemplary embodiments realized as individual features of the following groups.

1. Satellite system for navigation and/or geodesy with
    a plurality of MEO satellites, each comprising a dedicated clock, which are arranged in a distributed manner on at least two, preferably three, orbital planes and orbit the Earth, wherein a plurality of MEO satellites, particularly eight, are located in each orbital plane, and/or
    a plurality of LEO satellites and/or a plurality of ground stations, and/or
    wherein each MEO satellite comprises two optical terminals, namely a first optical terminal for bidirectional free-beam communication by means of lasers with the respectively next or respectively two next MEO satellites orbiting ahead in the same orbital plane, a second optical terminal for bidirectional optical free-beam communication by means of lasers with the respectively next or the respectively two next MEO satellites orbiting behind in the same orbital plane, and optionally a third optical terminal provided for bidirectional optical free-beam communication by means of lasers with respectively one of the plurality of LEO satellites and/or with respectively one of the plurality of ground stations, and/or
    wherein, due to the optical free-beam communication of the MEO satellites, their clocks can be synchronized for each orbital plane and the MEO satellites of a common orbital plane each provide an orbital plane time due to time leveling according to the composite clock principle, and/or
wherein the LEO satellites and/or the ground stations level the orbital plane times.
2. Satellite system according to item 1, characterized in that the clocks of each MEO satellite comprise a cavity-stabilized or a resonator-stabilized laser with an optical resonator.
3. Satellite system according to item 1 or 2, characterized in that the MEO satellites orbit the Earth at the same distance or substantially at the distance, wherein the distance being between 20,000 km and 25,000 km, and particularly 23,000 km.
4. Satellite system according to any one of items 1 to 3, characterized in that the LEO satellite comprises a plurality of higher-orbiting first LEO satellites orbiting the Earth at a same first distance of or substantially of 1,000 km to 1,400 km, particularly 1,200 km, and a plurality of lower-orbiting second LEO satellites orbiting the Earth at a same second distance of 200 km to 600 km, particularly 300 km or 400 km to 600 km.
5. Satellite system according to any one of items 1 to 4, characterized by the LEO satellites and the ground stations, wherein the LEO satellites comprise, for communication with the MEO satellites and the ground stations, frequency converters, particularly frequency combs, for converting the optical signals of the MEO satellites into radio signals for the ground stations and vice versa.
6. Satellite system according to any one of items 1 to 5, characterized in that the LEO satellites comprise cavity-stabilized or resonator-stabilized laser clocks and/or inertial sensors for measuring the Earth's gravitational field.
7. Satellite system according to any one of items 1 to 6, characterized in that the optical bidirectional free-beam communication between the MEO satellites of a common orbital plane can be used to measure the MEO satellite orbit and/or the solar pressure.
8. Satellite system according to any one of items 1 to 7, characterized in that the ground stations can be used for leveling the orbital plane times, leveled by the LEO satellite, of the MEO satellites with a or with the terrestrial time reference system by taking into account a potential relative rotation of the Earth and the MEO satellite arrangement.

The invention claimed is:
1. A satellite system for navigation and/or geodesy, comprising
a plurality of MEO satellites (in a height of 10,000 km to 30,000 km), each comprising a dedicated clock, which are arranged in a distributed manner on orbital planes and orbit the Earth, and
a plurality of LEO satellites and/or a plurality of ground stations,
wherein each MEO satellite comprises optical terminals for bidirectional transmission of optical free-space signals by means of lasers with other MEO satellites, and
wherein, by means of the optical free-space signals, the clocks of the MEO satellites are synchronized with each other and wherein distance between the satellites is determined in support of navigation and/or geodesy.
2. The satellite system according to claim 1, wherein the clock of each MEO satellite comprises a laser stabilized by an optical cavity.
3. The satellite system according to claim 1, wherein the MEO satellites transmit radio signals for navigation and synchronize these with the synchronized optical clock signals by means of a frequency comb.
4. The satellite system of claim 3, wherein the navigation signals are in the L or S band.
5. The satellite system according to claim 1, wherein the LEO satellites (in a height of 400 to 1,500 km) and/or ground stations are equipped with navigation receivers to receive radio signals of the MEO satellites.
6. The satellite system according to claim 1, wherein the LEO satellites are equipped with transmitters and the MEO satellites with receivers for radio signals to perform bidirectional pseudorange measurements of the MEO and/or LEO satellites.
7. The satellite system according to claim 1, wherein the MEO satellites are equipped with a terminal that can be aligned with at least respectively one of the LEO satellites and/or respectively one of the ground station.
8. The satellite system according to claim 1, wherein at least one LEO satellite carries at least one optical terminal.
9. The satellite system according to claim 1, wherein the orbital plane times in the individual orbital planes of the MEO satellites are synchronized via the LEO satellites and/or the ground stations by using optical signals and/or radio waves.
10. The satellite system according to claim 1, wherein clocks with a low Allan standard deviation are operated on LEO satellites and/or in ground stations and that the time-synchronized constellation of MEO satellites is used for time distribution.
11. The satellite system according to claim 1, wherein the MEO satellites and/or the LEO satellites and/or the ground stations exchange measurements and/or other information on optical signals or radio waves.
12. The satellite system according to claim 1, wherein, the ground stations estimate the orbits, signal offsets and optionally atmospherical parameters on LEO satellites and/or control stations on the ground and distribute this information via optical signals and/or radio waves to the MEO satellites.
13. The satellite system according to claim 1, wherein orbital variations of LEO satellites determinable by acceleration sensors can be used to measure the Earth's gravitational field.
14. The satellite system according to claim 1, wherein, orbital variations of MEO satellites determinable by distance measurements between the MEO satellites of each orbital plane can be used for measuring the radiation pressure of the Sun.
15. The satellite system of claim 1, wherein the plurality of MEO satellites is eight satellites.
16. The satellite system of claim 1, wherein a plurality of MEO satellites are located in each orbital plane.
17. A satellite system for navigation and/or geodesy, comprising
a plurality of MEO satellites (in a height of 10,000 km to 30,000 km), each comprising a dedicated clock, which are arranged in a distributed manner on orbital planes and orbit the Earth, wherein a plurality of MEO satellites are located in each orbital plane, and
a plurality of LEO satellites and/or a plurality of ground stations,
wherein each MEO satellite comprises optical terminals for bidirectional transmission of optical free-space signals by means of lasers, and
wherein, by means of the optical free-beam signals, the clocks of the MEO satellites are synchronized with each other for each orbital plane at an orbital plane time applicable to this orbital plane and wherein the MEO satellites transmit radio signals for navigation and synchronize these with the highly stable optical clock signals by means of a frequency comb.

18. The satellite system of claim 17, wherein the navigation signals are in the L or S band.

19. A satellite system for navigation and/or geodesy, comprising
- a plurality of MEO satellites (in a height of 10,000 km to 30,000 km), each comprising a dedicated clock, which are arranged in a distributed manner on orbital planes and orbit the Earth, wherein a plurality of MEO satellites are located in each orbital plane, and
- a plurality of LEO satellites and/or a plurality of ground stations,
- wherein each MEO satellite comprises optical terminals for bidirectional transmission of optical free-space signals by means of lasers, and
- wherein, by means of the optical free-beam signals, the clocks of the MEO satellites are synchronized with each other for each orbital plane at an orbital plane time applicable to this orbital plane and
- wherein the orbital plane times in the individual orbital planes of the MEO satellites are synchronized via the LEO satellites and/or the ground stations by using optical signals and/or radio waves.

* * * * *